Feb. 14, 1967    HUGH L. DRYDEN DEPUTY    3,304,028
ADMINISTRATOR OF THE NATIONAL AERONAUTICS
AND SPACE ADMINISTRATION
ATTITUDE CONTROL FOR SPACECRAFT

Filed Aug. 11, 1964    2 Sheets-Sheet 1

INVENTORS
JOHN C. NICKLAS
JAMES D. ACORD
JAMES O. LONBORG
JAMES C. RANDALL
BY 9. McCoy
ATTORNEY

Feb. 14, 1967     HUGH L. DRYDEN DEPUTY     3,304,028
ADMINISTRATOR OF THE NATIONAL AERONAUTICS
AND SPACE ADMINISTRATION
ATTITUDE CONTROL FOR SPACECRAFT
Filed Aug. 11, 1964     2 Sheets-Sheet 2
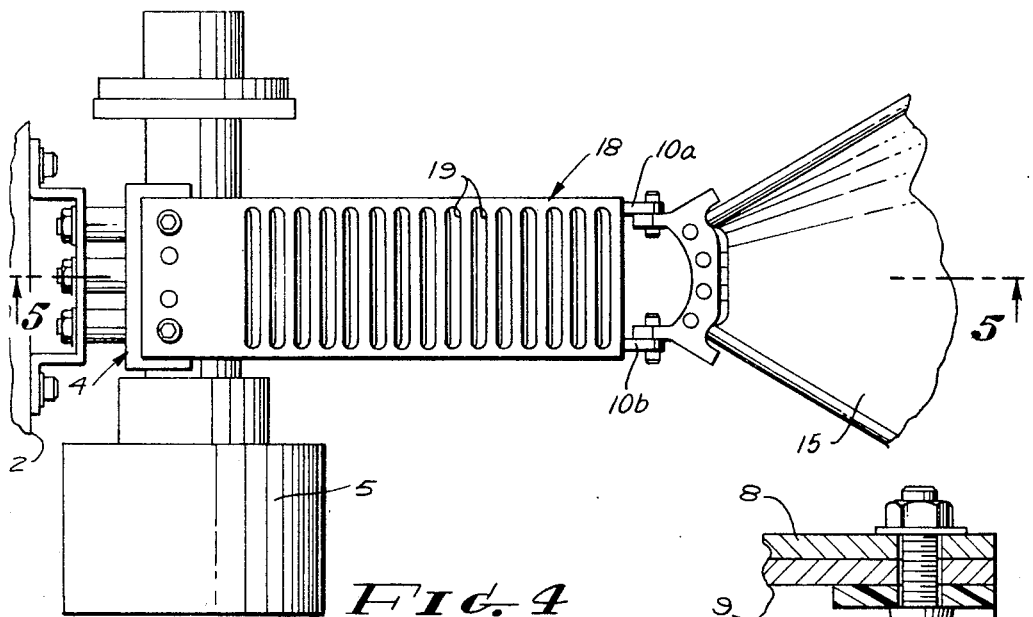
FIG. 4
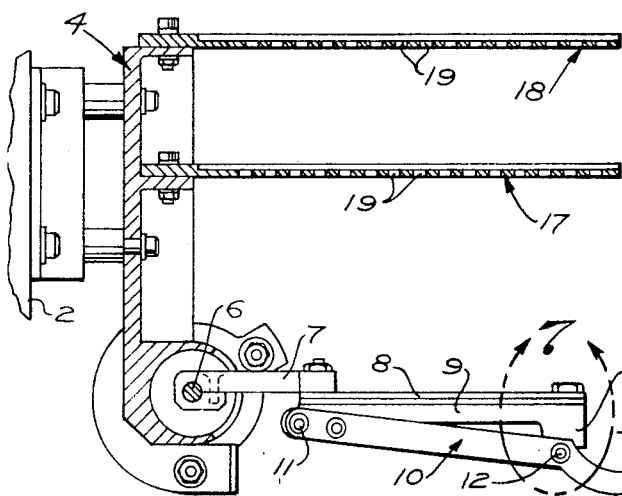
FIG. 5
FIG. 7
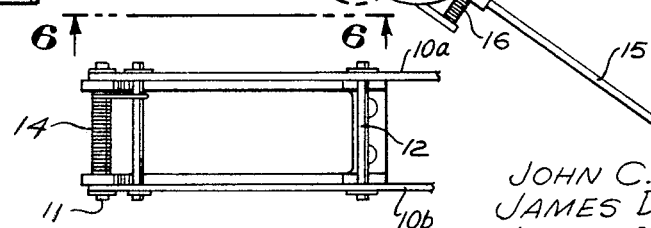
FIG. 6
INVENTORS
JOHN C. NICKLAS
JAMES D. ACORD
JAMES O. LONBORG
JAMES C. RANDALL
BY  G. J. McCoy
ATTORNEY 3,304,028
ATTITUDE CONTROL FOR SPACECRAFT
Hugh L. Dryden, Deputy Administrator of the National Aeronautics and Space Administration with respect to an invention of John C. Nicklas, James D. Acord, James O. Lonborg, and James C. Randall
Filed Aug. 11, 1964, Ser. No. 388,966
6 Claims. (Cl. 244—1)

The invention described herein was made in the performance of work under a National Aeronautics and Space Administration contract subject to the provisions of Section 305 of the National Aeronautics and Space Act of 1958, Public Law 85-568 (72 Stat. 435; 42 U.S.C. 2457).

This invention relates to attitude controls for spacecraft and included in the objects of this invention are:

First, to provide an attitude control for spacecraft which utilizes movable control surfaces exposed to solar pressure so arranged that by adjustment of these surfaces the incident solar radiation is converted into mechanical torques about the center of mass of the spacecraft.

Second, to provide an attitude control for spacecraft which incorporates temperature responsive elements which, on exposure to the radiant energy from the sun, alters the position of the control surfaces and which utilizes shutter means which vary exposure of the temperature responsive elements so as to cause the control surfaces to maintain the spacecraft in a predetermined attitude relative to the sun.

Third, to provide an attitude control for spacecraft which does not need the use of any consumable energy source, or the use of any solar cells needed for generating electrical energy required for operation of the equipment carried by the spacecraft, in order to maintain the attitude of the spacecraft, but which is instead self-sufficient for its operation.

Fourth, to provide an attitude control for spacecraft which, although capable of complete attitude control of the spacecraft, may be utilized as a vernier attitude control which is brought into operation after jets, or other control means, have brought the spacecraft into the approximately desired attitude.

With the above and other objects in view, as may appear hereinafter, reference is directed to the accompanying drawings in which:

FIGURE 4 is a fragmentary top view of one of the attitude control units;

FIGURE 5 is a fragmentary sectional view thereof through 5—5 of FIG. 4;

FIGURE 6 is a fragmentary view taken through 6—6 of FIG. 5;

FIGURE 7 is an enlarged fragmentary sectional view taken within circle 7 of FIG. 5.

Figure 1:
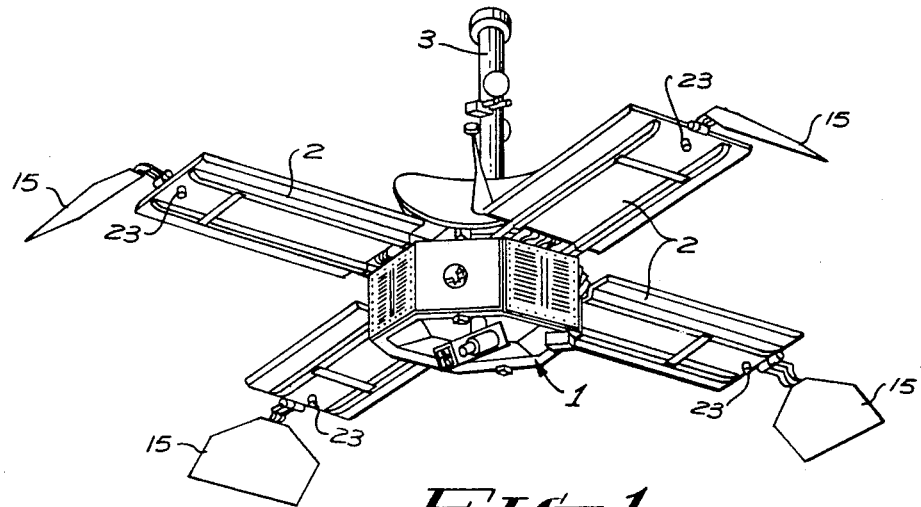
FIGURE 1 is a typical spacecraft showing attitude controls at the extremities thereof.

A typical spacecraft may involve a central body or mass 1 having radiating arms 2 which may be solar panels. As is well known, solar panels respond to energy from the sun which is intercepted by the panels so as to develop solar pressure froces. These solar pressures are used in the practice of the invention to control the attitude of the spacecraft. Mounted at the center of the spacecraft is a low gain antenna mast 3.

At the extremity of each panel or arm 2 is a bracket 4 (FIGURES 4 and 5) extending at right angles to the panel and supporting a positioning motor 5. The positioning motor includes a shaft 6 (FIGURE 5) to which is secured a radial mounting arm 7.

Secured to the extremity of the mounting arm is a bimetallic element 8 comprising two strips of dissimilar metals bonded together. Each bimetallic element warps in proportion to its temperature. The bimetallic elements are disposed so that when the axis of the antenna mast 3 is aligned with the sun, they are essentially normal to the sun's axis and with the sun, the bimetallic elements are equally exposed to the radiant energy therefrom.

Also secured to the extremity of the mounting arm 7 and underlying the bimetallic element 8 is a yieldable frame 9 (FIGURES 5 and 7) capable of warping as the extremity of the bimetallic element deflects. The frame 9 in turn pivotally supports, at its secured end adjacent the arm 7, a lever unit 10 by means of a fulcrum pin 11. The lever unit 10 extends under and beyond the frame 9 and is provided near its extended end with a stop engaging pin 12 adapted to engage a stop pad 13 provided at the extremity of the frame. The lever unit 10 may comprise two similar and parallel strips 10a, 10b (FIGURE 6) joined together by the fulcrum pin 11 and stop engaging pin 12.

Wrapped about the fulcrum pin 11 is a biasing spring 14 (FIGURE 6) which serves to hold the pin 12 in yieldable engagement with the stop pad 13. Attached to the extremity of the strips 10a, 10b, of the control lever unit 10 is a control vane, panel or surface 15 (FIGURE 5) which is preferably provided with a screw adjustment 16 so that the angular relation of the control surface may be preadjusted with respect to the lever unit 10. The control panels 15, like the radiating arms 2, may be solar panels, and when the angular positions of the control panels are varied, the effective area of exposure thereof to the sun is varied accordingly. In this manner, a controllable solar pressure control effect may be obtained.

Figure 2:
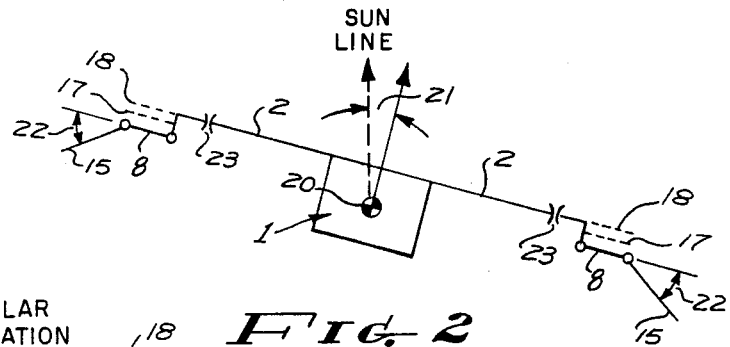
FIGURE 2 is a diagrammatical view illustrating the mode of operation of the attitude control.
Figure 3:
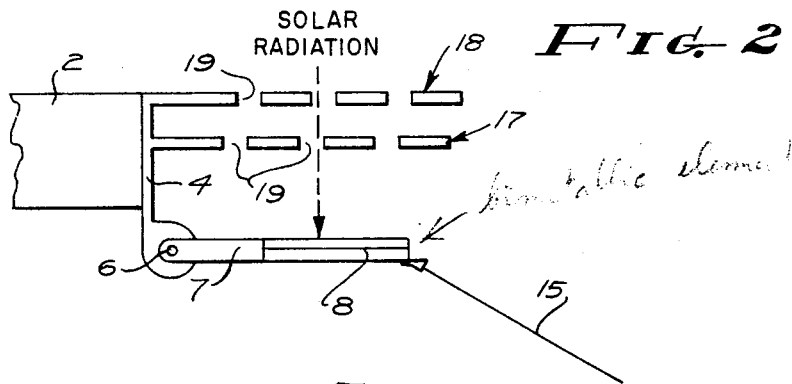
FIGURE 3 is a diagrammatical view showing the manner in which the control surfaces are varied in order to effect change in the stabilized attitude of the spacecraft.

Each bracket 4 supports a lower and an upper control shutter 17 and 18, respectively, which overlie the bimetallic element 8. The shutters 17 and 18 are plates in which are provided a series of slits 19 so arranged that for predetermined changes in attitude the exposure of the bimetallic element to the sun will vary in a predictable manner. As shown in FIGURES 2 and 3, the slits 19 in the shutter 17 are offset slightly with respect to the slits 19 in the shutter 18.

Operation of the attitude control is as follows:

With reference to FIG. 2, the solar panels or arms 2 are in front of the center of mass 20 of the spacecraft, that is, toward the sun with respect to the center of mass. Thus, the spacecraft would be basically unstable were it not for the control surfaces 15. An angular error indicated by 21 (FIGURE 2) will cause an unbalanced torque which will tend to increase this angle. In theory it is quite simple to design a passively stable spacecraft. It is necessary only to make certain that the centroid of solar pressure on the craft is "down sun" from the center of mass 20. This is analagous to the action of a sea anchor that holds the bow of a vessel into the wind during a storm. However, it has been found that such a configuration is not sufficient for the control of the spacecraft.

As shown in FIGURE 1, the center of pressure of the spacecraft without the vanes 15 attached lies between the center 20 of the mass and the sun. As previously discussed, this results in a statically unstable system, unless some means is provided to take care of the situation. Thus the purpose of attaching the vanes 15 is threefold: (1) to make the spacecraft system statically stable; (2) to align the stable position of the spacecraft with the null of the primary attitude control system; and (3) to supply retarding forces to damp out any oscillations that may occur.

The control surfaces 15 define positive angles designated 22 with respect to the solar panels (FIGURE 2). By choice of areas and lengths and positive angles of the control surfaces, the spacecraft may be rendered stable. Under this stable condition, an angular error 21 will then cause an unbalanced torque which will tend to decrease this angle. That is, should the attitude of the spacecraft change so as to change the angle 21, for example, the shutters 17 and 18 change the amount of radiant energy incident on the respective bimetallic elements 8 in FIGURE 2, so as to change correspondingly the angles 22 defined by the vanes. If the spacecraft is given an impulse, it would tend to oscillate about the center of mass 20 unless dampening means were used.

The arrangement of the control panels and shutters 17 and 18 and their effect on the bimetallic elements 8 may be predetermined so that the desired dampening effect may be readily attainable. That is, if the spacecraft is in an oscillatory mode, the shutters may be designed to differentially expose the bimetallic elements to counteract or dampen oscillation. This is aided by utilizing the thermal inertia of the bimetallic elements. That is, the vanes 15 are moved in a manner such that the torque of the vanes lags the spacecraft position.

While the attitude control has been described as the sole attitude control for the spacecraft and may in many cases constitute the sole control, it may be operated in conjunction with other controls and function to accomplish fine or vernier adjustment of the spacecraft.

In such case, the positioning motors 5 may be controlled by sensing means, not shown, so as to vary the gross angular positions of the arm 7 and frame 9 and thus of the control panels 15. The motors 5 may be of the well known stepping type, so that each motor is stepped from one particular angular position to the next upon the receipt of energizing current, and each motor remains locked in the stepped position when in a de-energized condition. Still further, attitude control jets 23 such as shown in a copending application of Batsch et al., Serial No. 182,696, filed April 4, 1962, now Patent No. 3,178,883, may be utilized with suitable sensory means to effect gross adjustment of the attitude of the spacecraft.

The attitude control herein disclosed is capable of maintaining a spacecraft within a small fraction of a degree of the desired attitude.

While a particular embodiment of this invention has been shown and described, it is not intended to limit the same to the exact details of the construction set forth, and it embraces such changes, modifications, and equivalents of the parts and their formation and arrangement as come within the purview of the appended claims.

What is claimed is:

1. An attitude control for spacecraft having a central mass and radiating arms, said control comprising:
    (a) angularly movable control surfaces at the extremities of said arms responsive to solar pressure;
    (b) bimetallic elements engageable with said control surfaces to vary the angular positions of said control surfaces thereby to vary the exposure of said control surfaces to the sun;
    (c) and means interposed between each of said bimetallic elements and the sun for varying the exposure thereof to the sun on change in attitude of the spacecraft thereby to cause said responsive means to vary the angular positions of said control surfaces in directions tending to move said spacecraft toward a preselected attitude relative to the sun.

2. An attitude control for spacecraft having a central mass and radiating arms, said control comprising:
    (a) angularly movable control surfaces at the extremities of said arms responsive to solar pressure;
    (b) bimetallic elements engageable with said control surfaces to vary the angular positions of said control surfaces thereby to vary the exposure of said control surfaces to the sun;
    (c) and shutters interposed between said bimetallic elements and the sun for varying the exposure of each of said control surfaces to the sun in directions tending to move said spacecraft toward a preselected attitude relative to the sun.

3. An attitude control for spacecraft having a central mass and radiating arms, said control comprising:
    (a) control surfaces at the extremities of said arms, said control surfaces being movable to vary their respective effective areas exposed to solar pressure;
    (b) bimetallic elements engageable with said control surfaces to vary their effective areas of exposure;
    (c) and means interposed between said bimetallic elements and the sun for varying the exposure thereof to the sun on changes in attitude of the spacecraft from a preselected attitude, thereby to cause a corrective change in the effective exposures of said control surfaces tending to restore said spacecraft to its preselected attitude.

4. An attitude control for spacecraft having a central mass and radiating arms, said control comprising:
    (a) control surfaces at the extremities of said arms, said control surfaces being movable to vary their respective effective areas exposed to solar pressure;
    (b) bimetallic elements engageable with said control surfaces to vary their effective areas of exposure;
    (c) and shutters interposed between said bimetallic elements and the sun for varying the exposure of each of said control surfaces to the sun in directions tending to move said spacecraft toward a preselected attitude relative to the sun.

5. The combination of claim 2 wherein said shutters include:
    (a) at least a pair of parallel plates each having a pair of oppositely disposed faces with at least one face thereof directed toward the sun;
    (b) means defining in each plate of said pair of plates a plurality of slits extending between the oppositely disposed faces thereof; and
    (c) means securing said pair of plates to a given one of the arms of the spacecraft in a manner such that said plates are arranged in face-to-face, mutually displaced relationship overlying given bimetallic elements.

6. In combination with a spacecraft having at least one displaceable control surface for dictating attitude for the spacecraft relative to the sun in response to an impingement of solar pressure thereon, a solar energy responsive actuator adapted for effecting displacement of the control surface comprising:
    (a) a lever pivotally connected between the spacecraft and the control surface adapted to be actuated for effecting displacement of the control surface;
    (b) a bimetallic strip adapted to deform in the presence of solar energy secured at one end to the spacecraft and having a free end engageable with said lever adapted to engage said lever and effect a variable actuation of said lever as a varying quantity of radiant energy is caused to impinge thereon;
    (c) at least a pair of parallel plates each having a pair of opposed faces with one face thereof being directed toward the sun;
    (d) means defining in each plate a plurality of openings extending between the faces;
    (e) means securing said pair of plates to the spacecraft in a manner such that said plates are disposed in a face-to-face, mutually displaced relationship with the openings thereof being arranged in a predetermined alignment between the sun and the bimetallic strip for passing solar energy to said strip in a varying quantity as the attitude of the spacecraft is caused to undergo a change.

(References on following page)

References Cited by the Examiner

UNITED STATES PATENTS

| | | | |
|---|---|---|---|
| 3,173,626 | 3/1965 | Sohn | 244—1 |
| 3,206,141 | 9/1965 | Dryden | 244—1 |
| 3,239,165 | 3/1966 | Sohn | 244—1 |

References Cited by the Applicant

UNITED STATES PATENTS

| | | |
|---|---|---|
| 3,145,948 | 8/1964 | Kershner. |

OTHER REFERENCES

Sohn, "Attitude Stabilization by Means of Solar Radiation Pressure," ARS Journal, pp. 371-373, May 1959.

Tsu, "Interplanetary Travel by Solar Sail," ARS Journal, pp. 422-427, June 1959.

Villers et al., "A Solar Sail Attitude Stabilizer, Satellites and Interplanetary Probes," ARS Space Flight Report to the Nation, New York Coliseum, Oct. 9-15, 1961.

McElvain, "Effects of Solar Radiation Pressure Upon Satellite Attitude Control," ARS Guidance, Control, and Navigational Conference, Aug. 7-9, 1961.

Roberson, "Attitude Control of Satellites and Space Vehicles," Advances in Space Science, 1960.

Astounding Science Fiction, May 1951, pages 136-143.

Jet Propulsion, March 1958, pages 188-190.

Solar Sailing, by Theodore P. Cotter, OTS Department of Commerce publication SCR-78, dated April 1959.

FERGUS S. MIDDLETON, *Primary Examiner.*